(12) United States Patent
Spardel

(10) Patent No.: US 10,948,591 B2
(45) Date of Patent: Mar. 16, 2021

(54) EXIT OBSTRUCTION WARNING SYSTEM

(71) Applicant: Michael Louis Spardel, Wayne, NJ (US)

(72) Inventor: Michael Louis Spardel, Wayne, NJ (US)

( * ) Notice: Subject to any disclaimer, the term of this patent is extended or adjusted under 35 U.S.C. 154(b) by 33 days.

(21) Appl. No.: 16/158,398

(22) Filed: Oct. 12, 2018

(65) Prior Publication Data

US 2019/0353782 A1 Nov. 21, 2019

Related U.S. Application Data

(60) Provisional application No. 62/673,259, filed on May 18, 2018.

(51) Int. Cl.
| | | |
|---|---|---|
| *G01S 5/04* | (2006.01) | |
| *G01S 15/04* | (2006.01) | |
| *G01S 15/89* | (2006.01) | |
| *G06K 9/62* | (2006.01) | |
| *G08B 3/10* | (2006.01) | |
| *G06K 9/00* | (2006.01) | |
| *G08B 5/36* | (2006.01) | |

(52) U.S. Cl.
CPC .............. *G01S 15/04* (2013.01); *G01S 15/89* (2013.01); *G06K 9/00771* (2013.01); *G06K 9/6267* (2013.01); *G08B 3/10* (2013.01); *G08B 5/36* (2013.01)

(58) Field of Classification Search
CPC ..... G01S 15/04; G01S 15/89; G06K 9/00771; G06K 9/6267; G08B 3/10; G08B 5/36
USPC .......................................................... 367/93
See application file for complete search history.

(56) References Cited

U.S. PATENT DOCUMENTS

| | | |
|---|---|---|
| 5,517,176 A | 5/1996 | Lavelle et al. |
| 5,969,637 A | 10/1999 | Doppelt et al. |
| 6,218,939 B1 | 4/2001 | Peper |
| 7,084,388 B2 | 8/2006 | Rejc |
| 7,109,677 B1 | 9/2006 | Gagnon et al. |
| 7,123,144 B2 | 10/2006 | Anderson et al. |
| 7,187,282 B2 | 3/2007 | Fergusson |
| 7,561,042 B2 | 7/2009 | Root |
| 7,737,860 B2 | 6/2010 | Banta et al. |
| 8,169,317 B2 | 5/2012 | Lemerand et al. |
| 9,007,459 B2 | 4/2015 | Meyer |
| 9,120,646 B2 | 9/2015 | Loeb et al. |
| 2001/0045327 A1 | 11/2001 | Shemanske, II et al. |
| 2005/0006109 A1* | 1/2005 | McSheffrey ............. A61N 1/39 169/75 |
| 2010/0073169 A1* | 3/2010 | Needham ............... A61J 7/0481 340/573.1 |
| 2012/0154583 A1 | 6/2012 | Lundberg et al. |

(Continued)

*Primary Examiner* — Joseph H Feild
*Assistant Examiner* — Sharmin Akhter
(74) *Attorney, Agent, or Firm* — Gearhart Law LLC

(57) ABSTRACT

An exit obstruction warning device monitoring an exit door and broadcasting an alert regarding an obstruction blocking the exit door is provided. The exit obstruction warning device includes a sensor, a processing module, and an output module. The sensor monitors the exit door for the obstruction. The output module broadcasts an alarm notification in response to the obstruction. The processing module receives a signal from the sensor that describes the obstruction blocking the exit door. The processing module processes the signal and operates the output module based on the signal.

17 Claims, 3 Drawing Sheets

(56) References Cited

U.S. PATENT DOCUMENTS

2016/0037135 A1\* 2/2016 McSheffrey ............. G06K 9/46
                                                                              348/143
2016/0247370 A1   8/2016 Lamb et al.
2016/0282320 A1\* 9/2016 Sloo .................... G01N 33/0063
2018/0075681 A1\* 3/2018 Scalisi ............... G06K 9/00771

\* cited by examiner

EXIT OBSTRUCTION WARNING SYSTEM

CLAIM OF PRIORITY

This application claims the priority benefit of U.S. Provisional Patent Application No. 62/673,259, filed on May 18, 2018, the contents of which are hereby fully incorporated by reference into this application.

FIELD OF THE EMBODIMENTS

The field of the present invention and its embodiments relate to an exit obstruction warning system that detects an obstruction blocking an exit path such as an exit door with ultrasound and/or visual sensors and broadcasts an alarm notification.

BACKGROUND OF THE EMBODIMENTS

An exit door provides an easy to locate opening that enables quick egress from a building. The exit door is built into an outside door of the building to allow the quick egress. Most exit doors open to an egress area outside the building. Alternatively, an exit door can open to a structure such as stairs that lead to the egress area outside the building. Local ordinances and/or state laws necessitate proper operation of the exit door to allow occupants of a building to quickly exit the building in the event of an emergency. Furthermore, emergencies such as fires, active shooter, and/or earthquakes, among other events necessitate proper operation of the exit door.

Similar to any entry or exit structure associated with the building, a variety of obstructions are capable of blocking the exit door of the building. Items such as, boxes, pallets, containers, and/or mobile structures, among others can be accidently or purposefully placed in an area of operation associated with the exit door. Such obstructions prevent operation of the exit door and deem the exit door unusable during an emergency. Static warning signs can be helpful in deterring the obstruction of the exit door. However, such warning signs rarely stop most preventable obstructions of the exit door.

Various systems and methodologies are known in the art. However, their structure and means of operation are substantially different from the present disclosure. The other inventions fail to solve all the problems taught by the present disclosure. At least one embodiment of this invention is presented in the drawings below and will be described in more detail herein.

SUMMARY OF THE EMBODIMENTS

The present invention and its embodiments relate to an exit obstruction warning device. In an example embodiment of the present invention, the exit obstruction warning device may include a sensor. The sensor may be configured to monitor an exit door for an obstruction. The exit obstruction warning device may also include an output module. The output module may be configured to broadcast an alarm notification. Furthermore, a processing module may be connected to the sensor and the output module. The processing module may be configured to receive a signal from the sensor, process the signal, and operate the output module based on the signal.

In another embodiment of the present invention, an exit obstruction warning system is described. The system may include a sensor with a camera component and an ultrasound emitter and detector. The sensor may be configured to monitor an exit door. The system may also include an output module. The output module may be configured to broadcast an alarm notification. The system may further include a processing module connected to the sensor and the output module. The processing module may be configured to receive a signal from the sensor, analyze the signal, identify an obstruction blocking the exit door from the analyzed signal, instruct the output module to broadcast the alarm notification during an initial time period, detect a failure to receive a new signal from the sensor during the initial time period, and instruct the output module to continue to broadcast the alarm notification. The new signal may be expected to describe a removal of the obstruction blocking the exit door.

In yet another embodiment of the present invention, a method of providing an exit obstruction warning system is described. The method includes receiving a signal from a sensor with an ultrasound emitter and detector. The signal describes detected reflections of ultrasound waves reflected from an obstruction blocking an exit door. Next, the signal is processed. The obstruction is identified as blocking the exit door from the processed signal. In response, an output module is instructed to broadcast an alarm notification. The alarm notification includes an audible alarm or a visual alarm.

It is an object of the present invention to provide an exit obstruction warning system that warns of an obstruction blocking an exit door.

It is an object of the present invention to provide an exit obstruction warning system that detects an obstruction with an ultrasound based sensor.

It is an object of the present invention to provide an exit obstruction warning system that detects an obstruction with a camera based sensor.

It is an object of the present invention to alert nearby personnel with an audible and/or visual alarm output device regarding an obstruction blocking an exit door.

It is an object of the present invention to notify a local and/or external alarm monitoring system regarding a continuous blockage of an exit doorway with an obstruction.

DESCRIPTION OF THE PREFERRED EMBODIMENTS

Figure 1:
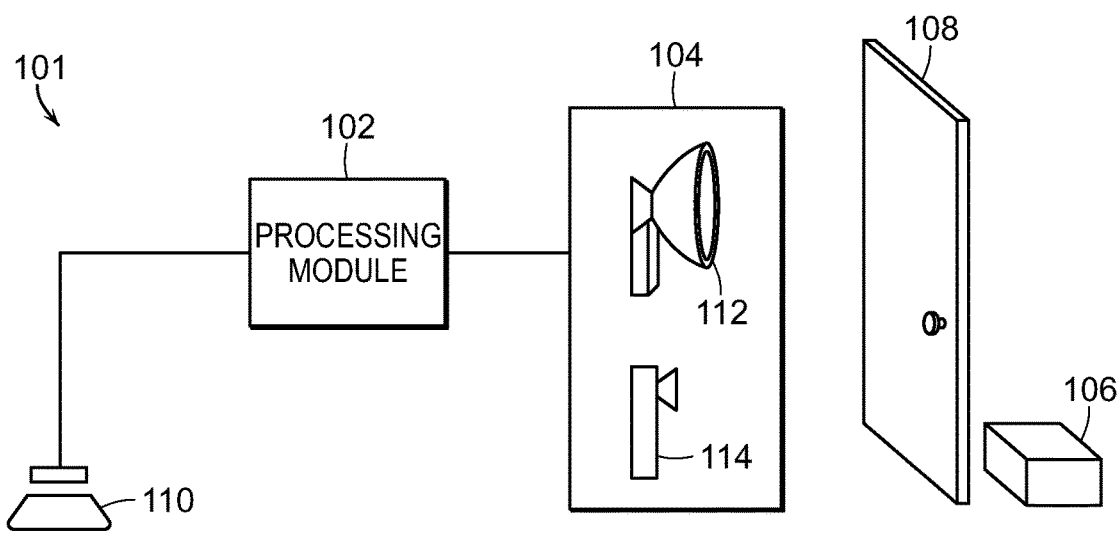
FIG. 1 shows a component view of an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows an exit obstruction warning device 101. Keeping an exit door 108 of a building free of an obstruction 106 is a significant priority to an entity (such as a business or a homeowner, among others) associated with the building. The exit door 108 may include a door within an outside wall of the building. The exit door 108 needs to be kept clear of the obstruction 106 to comply with fire ordinances and other requirements that necessitate quick egress from the building. As such, the exit obstruction warning device 101 may provide an alarm and/or a warning to the entity or agents of the entity (such as personnel associated with the entity) to clear the obstruction 106 blocking an operation of the exit door 108.

In an example embodiment, the exit obstruction warning device 101 may include a sensor 104, an output module 110, and a processing module 102. Components or an entirety of the exit obstruction warning device 101 may be placed near the exit door 108 for monitoring. The sensor 104 may be configured to monitor the exit door 108 for the obstruction 106 that may block the exit door 108 from operating. The sensor 104 may be placed within a line of sight to the exit door 108 to monitor an area of operation associated with the exit door 108 for the obstruction 106. The sensor 104 may have multiple components and may be placed in front of and/or behind the exit door 108 to monitor the area of operation associated with the exit door 108.

The sensor 104 may include an ultrasound emitter and detector 112. The ultrasound emitter and detector 112 may include an emitter that transmits ultrasound waves and a detector that detects reflections of the transmitted ultrasound waves. The reflections may be captured as a signal and transmitted to the processing module 102 for an analysis.

The sensor 104 may also include a camera component 114. The camera component 114 may capture a video stream or an image of an operation area associated with the exit door 108. The captured video stream and/or image may be transmitted to the processing module 102 for an analysis.

Alternatively, the sensor 104 may include other transmitter and receiver devices to capture a 2D or 3D representation of the operation area associated with the exit door 108. Examples of the transmitter and receiver devices may include a radio signal based device (such as radar, and/or millimeter wave, among others), an infrared wave based device, and/or a laser based device (such as LIDAR), among others.

The processing module 102 may include a central processing unit (CPU), a memory, a storage, and a networking component. The processing module 102 may process incoming signals from the sensor 104 to detect the obstruction 106 blocking the exit door 108. The processing module 102 may also manage an output module 110 to initiate an alarm regarding the obstruction 106 blocking the exit door 108. The output module 110 may include an audible component (such as a speaker) that may broadcast an audible alarm in response to an instruction from the processing module 102. The output module 110 may also include a visual component (such as a light strobe, and/or a monitor, among others) that may display a visual alarm (such as a flashing light, a constant light, and/or a warning sign/image/video, among others).

The processing module 102 may be a stand-alone unit. Alternatively, the processing module 102 may be integrated to the sensor 104 and/or the output module 110. Alternatively, the sensor 104, the processing module 102, and the output module 110 may be enclosed in a single housing. The sensor 104, the processing module 102, and/or the output module 110 may include networking components to communicate with each other through wired and/or wireless network(s).

Figure 2:
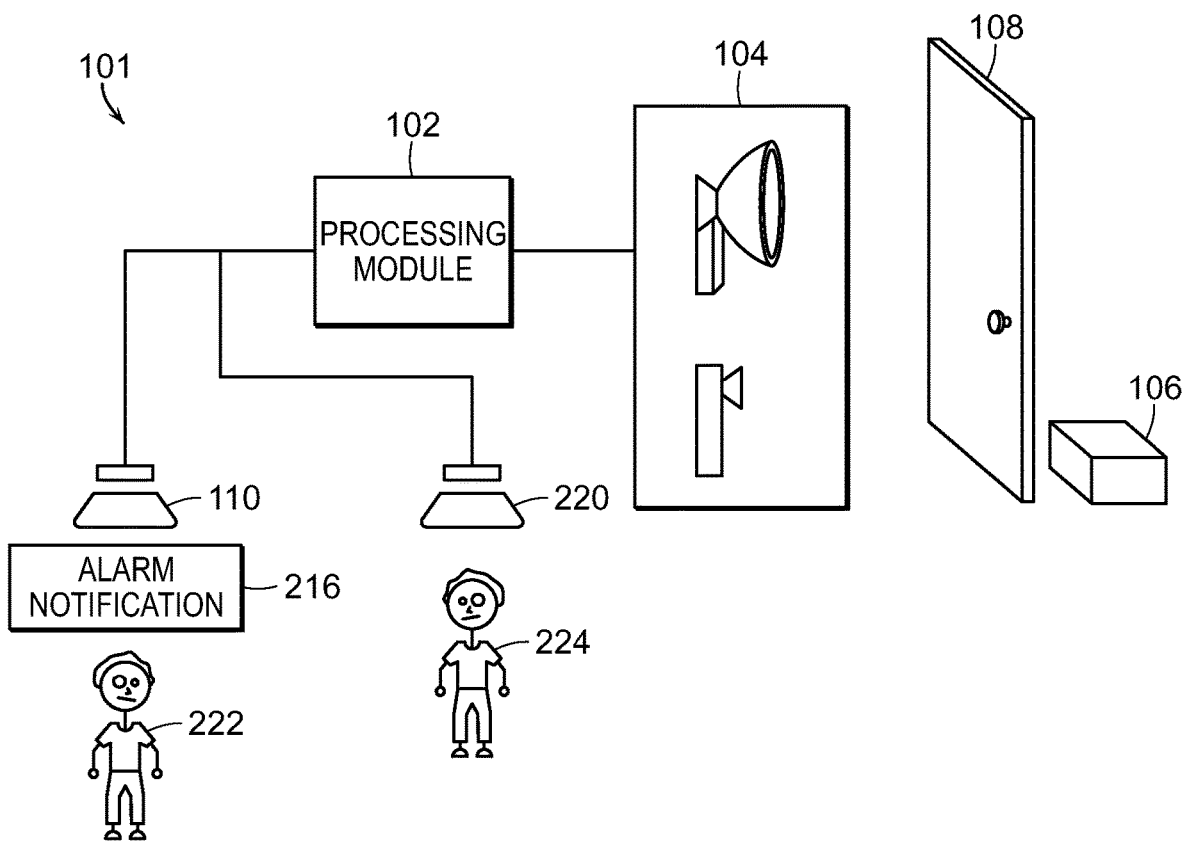
FIG. 2 shows an interaction view of an embodiment of the present invention.

FIG. 2 shows the exit obstruction warning device 101 interacting with a personnel 222 and a personnel 224 in relation to the obstruction 106 blocking the exit door 108. The personnel (222 and 224) may be agents of an entity associated with the building. The building includes the exit door 108. As such, the exit obstruction warning device 101 may warn the personnel (222 and/or 224) of the obstruction 106 blocking the exit door 108 to prompt the personnel (222 and/or 224) to remove the obstruction 106.

In an example scenario, the sensor 104 may automatically or on demand scan an operation area associated with the exit door 108 to detect the obstruction 106. The obstruction 106 may include a box, a container, and/or an item, among others that may block the operation of the exit door 108 (if located in an operation area associated with the exit door 108). If inoperable because of the obstruction 106, the exit door 108 may prevent quick egress from the associated building. Inability to quickly egress from the building may be dangerous to the occupants of the building during an emergency.

In an example scenario, the sensor 104 may transmit ultrasound waves towards the operation area associated with the exit door 108. The sensor 104 may capture reflections of the transmitted ultrasound waves. The reflections may be analyzed to detect a shape of the obstruction 106 blocking the exit door 108. Alternatively, the sensor 104 may capture a video stream or an image of the operation area associated with the exit door 108. The video stream or the image may be processed to detect the obstruction 106 blocking the exit door 108.

The sensor may send a signal that includes the captured reflections (of the transmitted ultrasound waves) and/or the video stream/image of the exit door. The sensor 104 may convert the captured reflections to an electronic description of the three dimensional space within the operation area of the exit door 108. The description may be embedded into the signal. Furthermore, the signal may include the video stream (and/or the image) of the exit door 108. In addition, the sensor 104 may scan the exit door 108 periodically or on demand, in response to an instruction from the processing module 102.

The processing module 102 may receive the signal from the sensor 104. The processing module 102 may analyze and detect a shape of the obstruction 106 described by the reflections (of the emitted ultrasound waves) embedded into the signal. The shape and a placement of the obstruction 106 may be detected as interfering with an operation of the exit door 108. Next, the processing module 102 may operate the output module 110 by instructing the output module 110 to broadcast an alarm notification 216. The alarm notification 216 may include an audible alarm and/or a visual alarm to warn a personnel 222 regarding the obstruction 106 blocking the exit door 108.

In an example embodiment, the processing module 102 may have access to multiple output modules (110 and/or 220) to maximize a chance of warning the personnel 222 or the personnel 224 regarding the obstruction 106 blocking the exit door 108. The processing module 102 may identify the personnel 222 at a location proximate to an output module 110 from the analyzed signal. The ultrasound reflections, the video stream, and/or the image embedded in the signal may also include location information associated with the personnel (222 and/or 224) in relation to the output modules (110 and/or 220). The processing module 102 may process the signal received from the sensor 104 to discern proximity information associated with the personnel (222 and/or 224) in relation to the output modules (110 and/or 220). Alternatively, other signals from sensors configured to monitor areas around the output modules (110 and/or 220) may be analyzed to discern location information associated with the personnel (222 and/or 224) in relation to the output modules (110 and/or 220).

The processing module 102 may detect the personnel 222 within a broadcast range of the output module 120. The personnel 224 may be detected as outside the broadcast range of the output module 210. As such, the processing module 102 may select the output module 110 to broadcast the alarm notification 216 to warn the personnel 222 regarding the obstruction 106 blocking the exit door 108. The alarm notification 216 may include an audible and/or a visual alarm.

Alternatively, the processing module 102 may detect both the personnel 222 within the broadcast range of the output module 110 and the personnel 224 within the broadcast range of the output module 220. In such a scenario, the processing module 102 may select one of the output modules (110 or 220) that is detected as nearest the associated personnel (222 or 224) for broadcasting the alarm notification 216.

The output module 110 may be instructed to broadcast the alarm notification 216 for a time period or continuously. In an example scenario, the processing module 102 may detect a new signal from the sensor 104 during a broadcast of the alarm notification 216. The processing module 102 may analyze the new signal. The processing module 102 may detect (from the analyzed signal) the removal (by the personnel 222) of the obstruction 106 blocking the exit door 108. In response, the processing module 102 may instruct the output module 120 to terminate a broadcast of the alarm notification 216.

In another example scenario, the processing module 102 may identify a classification associated with the obstruction 106 from the signal. The processing module 102 may perform an object recognition operation on the signal using local and/or remote object recognition resources. The object recognition operation may label the obstruction 106 with a classification (or an attribute). The processing module 102 may integrate the classification to the alarm notification 216 to be broadcast by the output module 110. The classification may include a type, a shape, a predicted weight, and/or a predicted size of the obstruction 106.

The processing module 102 may also compare attributes of the obstruction 106 (determined from the classification) to capabilities of the personnel 222 to remove the obstruction 106. If the attributes (such as weight and/or size of the obstruction 106) and capabilities (such as lift capacity of the personnel 222) match then the processing module 102 may inform the personnel 222 regarding the obstruction 106 through the alarm notification 216. Alternatively, if the attributes and capabilities do not match then the processing module 102 may not initiate the output module 110. The processing module 102 attempt to locate and alert another personnel such as the personnel 224 who may have capabilities that match attributes of the obstruction 106.

Figure 3:
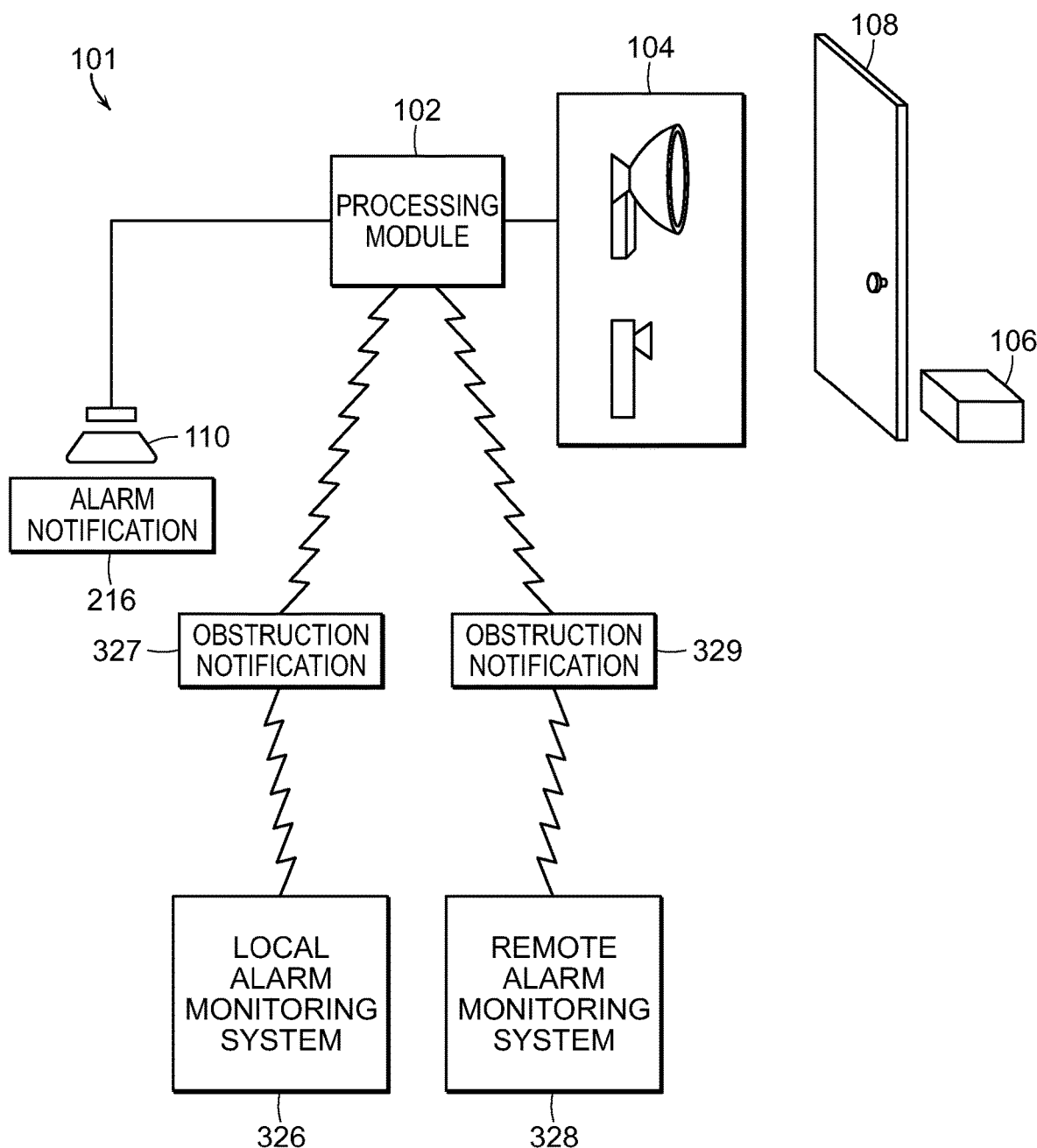
FIG. 3 shows a communication view of an embodiment of the present invention.

FIG. 3 shows the exit obstruction warning device 101 in communication with alarm monitoring systems (326 and/or 328). In an example scenario, the processing module 102 may detect the obstruction 106 blocking the exit door 108 and instruct the output module 110 to broadcast the alarm notification 216 during an initial time period. The initial time period may include a time period sufficient to allow a personnel to remove the obstacle 106 upon hearing or seeing the alarm notification 216. An example of the initial time period may include 1, 2, 5, and/or 10 minutes, among others.

Next, the processing module 102 may fail to detect a new signal from the sensor 104 during the initial time period. The new signal may be expected to describe a removal of the obstruction 106 (to allow an operation of the exit door 108). In response to the failure to detect the new signal, the output module 110 may be instructed to continuously broadcast the alarm notification 216.

The processing module 102 may monitor the sensor 104 for an additional time period. The additional time period may include an extension to allow the personnel to clear the obstruction 106. An example of the additional time period may include 1, 2, 5, 10, 20, 30 minutes, and/or 1 hour among others. The processing module 102 may fail to detect the new signal (that describes a removal of the obstruction 106) during the additional time period. In response, the processing module 102 may transmit an obstruction notification 327 to a local alarm monitoring system 326. The obstruction notification 327 may describe a failure to remove the obstruction 106 during the initial and additional time periods.

The local alarm monitoring system 326 may include a building management system or other local system that monitors a state of the building (that encloses the exit door 108). The local alarm monitoring system 326 may have routines to address a failure to remove the obstruction 106. As such, the processing module 102 may prompt the local alarm monitoring system 326 with the obstruction notification 327 to initiate further action regarding the obstruction 106 blocking the exit door 108.

Alternatively, the processing module 102 may transmit an obstruction notification 329 to a remote alarm monitoring system 328. The obstruction notification 329 may describe a failure to remove the obstruction 106. The remote alarm monitoring system 328 may include a system operated by an alarm monitoring company that manages alarm events associated with the building (enclosing the exit door 108). The remote alarm monitoring system 328 may have routines to address a failure to remove the obstruction 106. As such, the processing module 102 may prompt the remote alarm monitoring system 328 with the obstruction notification 329 to initiate further action regarding the obstruction 106 blocking the exit door 108. Furthermore, the processing module 102 may instruct the output module 110 to terminate broadcasting the alarm notification 216 prior to or upon transmitting the obstruction notifications (327 and/or 329) to the alarm monitoring systems (326 and/or 328).

In yet another alternative scenario, the remote alarm monitoring system 328 may be alerted regarding the obstruction 106 in response to a failure (to remove the obstruction 106) after alerting the local alarm monitoring system 326. As such, a failure to remove the obstruction 106 (after alerting the local alarm monitoring system 326) may be mitigated by alerting the remote alarm monitoring system 328.

Figure 4:
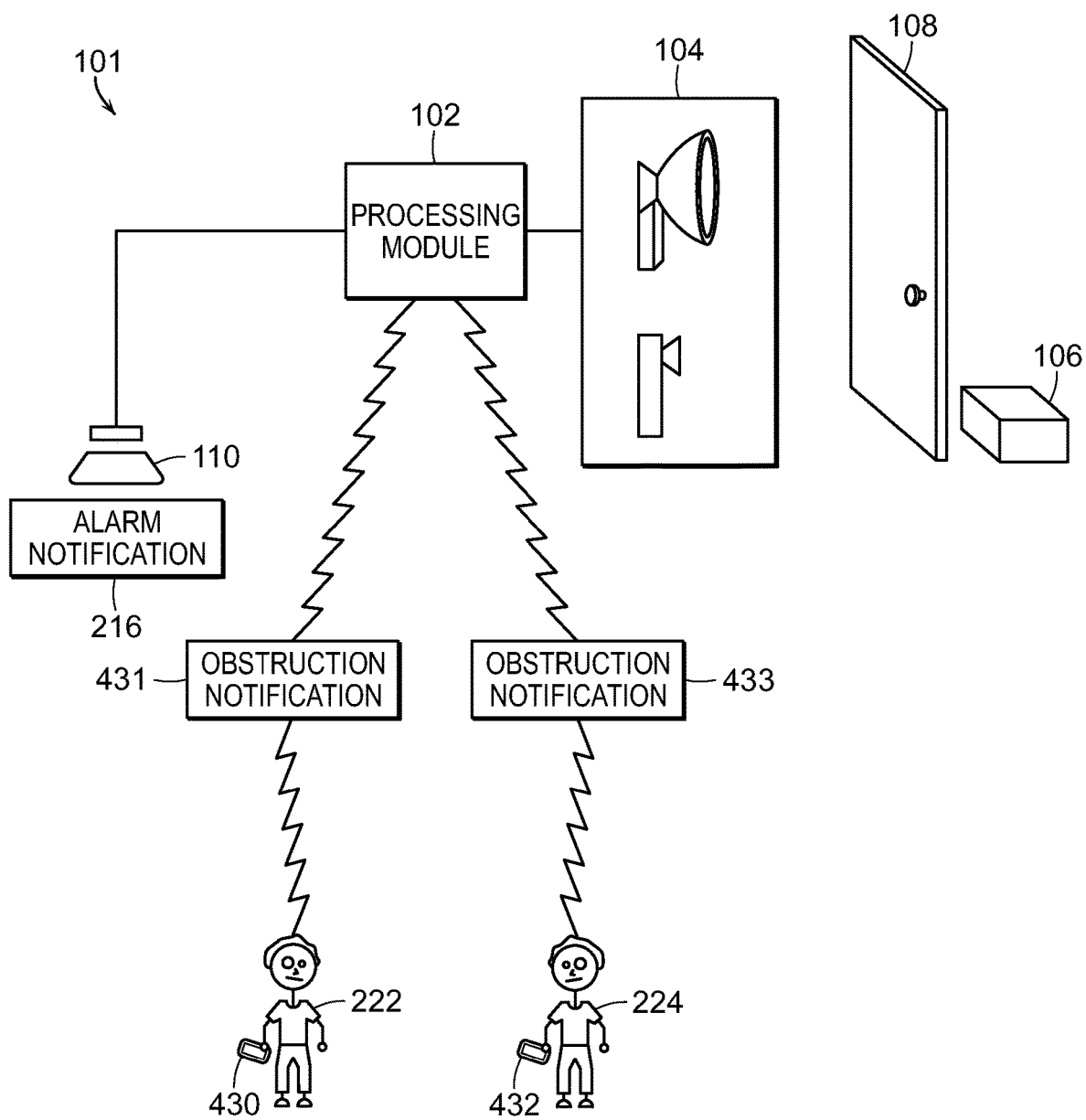
FIG. 4 shows another communication view of an embodiment of the present invention.

FIG. 4 shows the exit obstruction warning device 101 in communication with mobile devices (430 and/or 432) associated with the personnel (222 and/or 224). In an example scenario, the processing module 102 may detect the obstruction 106 blocking the exit door 108 and instruct the output module 110 to broadcast the alarm notification 216. After initiating the alarm notification 216, the processing module 102 may fail to receive a new signal from the sensor during a time period. The new signal may be expected to describe a removal of the obstruction 106. In response to the failure to remove the obstruction 106, the processing module 102 may transmit obstruction notifications (431 and/or 433) to the mobile devices (430 and/or 432) of the personnel (222 and/or 224). The obstruction notifications (431 and/or 433) may describe a failure to remove the obstruction 106 during the time period.

The obstruction notifications (431 and 433) may be transmitted to the mobile device (430 and 432) at the same time to prompt both the personnel (222 and 224) to take action to remove the obstruction 106. Alternatively, the obstruction notifications (431 or 433) may be transmitted subsequent to a detected failure by one of the personnel (222 or 224) to take an action to remove the obstruction 106.

A method of providing an exit obstruction warning system is also described. The method includes receiving a signal from a sensor with an ultrasound emitter and detector. The signal describes detected reflections of ultrasound waves reflected from an obstruction blocking an exit door. Next, the signal is processed. The obstruction is identified as blocking the exit door from the processed signal. In response, an output module is instructed to broadcast an alarm notification. The alarm notification includes an audible alarm or a visual alarm.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. An exit obstruction warning device comprising:
   a sensor, wherein the sensor is configured to monitor an exit door for an obstruction;
   an output module, wherein the output module is configured to broadcast an alarm notification;
   a processing module coupled to the sensor and the output module, wherein the processing module is configured to:
   receive a first signal from the sensor;
   analyze the first signal;
   detect the obstruction blocking the exit door from an analysis of the first signal;
   identify a personnel at a location proximate to the output module from the first signal;
   instruct the output module to broadcast the alarm notification;
   receive a second signal from the sensor;
   analyze the second signal;
   detect a removal of the obstruction blocking the exit door from an analysis of the second signal; and
   instruct the output module to terminate a broadcast of the alarm notification in response to receiving the second signal.

2. The exit obstruction warning device of claim 1, wherein the processing module is further configured to:
   analyze the first signal;
   detect the obstruction blocking the exit door from the first signal; and
   instruct the output module to broadcast the alarm notification.

3. The exit obstruction warning device of claim 2, wherein the first signal and the second signal describes reflections of ultrasound waves emitted towards the exit door by an ultrasound emitter and detector of the sensor.

4. The exit obstruction warning device of claim 2, wherein the first signal and the second signal includes a video stream or an image of the exit door captured by a camera component of the sensor.

5. The exit obstruction warning system of claim 1, wherein detecting the personnel at the location proximate to the output module further comprises one or more operations to:
   process a video stream or image embedded within the first signal or second signal; and
   identify the personnel at the location proximate to the output module from the processed video stream or image.

6. The exit obstruction warning system of claim 1, wherein the location is within an audible or visual range from the output module.

7. The exit obstruction warning system of claim 1, wherein the alarm notification includes an audible alarm.

8. The exit obstruction warning system of claim 1, wherein the alarm notification includes a visual alarm.

9. An exit obstruction warning system comprising:
   a sensor comprising a camera component and an ultrasound emitter and detector, wherein the sensor is configured to monitor an exit door;
   an output module, wherein the output module is configured to broadcast an alarm notification;
   a processing module coupled to the sensor and the output module, wherein the processing module is configured to:
   receive a signal from the sensor;
   analyze the signal;
   identify an obstruction blocking the exit door from the analyzed signal;
   instruct the output module to broadcast the alarm notification during an initial time period;
   detect a failure to receive a new signal from the sensor during the initial time period, wherein the new signal is expected to describe a removal of the obstruction blocking the exit door; and
   instruct the output module to continue to broadcast the alarm notification.

10. The system of claim 9, wherein the processing module is further configured to:
    monitor the sensor for an additional time period; and
    detect another failure to receive the new signal during the additional time period.

11. The system of claim 10, wherein the processing module is further configured to:
    transmit an obstruction notification to a local alarm monitoring system, wherein the obstruction notification describes the obstruction continuously blocking the exit door.

12. The system of claim 10, wherein the processing module is further configured to:
    transmit an obstruction notification to an external alarm monitoring system, wherein the obstruction notification describes the obstruction continuously blocking the exit door.

13. The system of claim 10, wherein the processing module is further configured to:
    transmit an obstruction notification to a mobile device associated with a personnel, wherein the obstruction notification describes the obstruction continuously blocking the exit door.

14. A method of providing an exit obstruction warning system, the method comprising:
    receiving at least one signal from a sensor with an ultrasound emitter and detector, wherein the at least one signal describes detected reflections of ultrasound waves reflected from an obstruction blocking an exit door;

processing the at least one signal,
wherein the processing of the at least one signal includes:
analyzing a first signal;
detecting the obstruction blocking the exit door based on an analysis of the first signal;
identifying a personnel at a location proximate to the output module from the first signal;
instructing the output module to broadcast an alarm notification based on the analysis of the first signal;
receiving a second signal from the sensor;
analyzing the second signal;
detecting a removal of the obstruction blocking the exit door based on an analysis of the second signal; and
instruct the output module to terminate a broadcast of the alarm notification in response to the analysis of the second signal; and
wherein the alarm notification includes one or more of an audible alarm notification and a visual alarm.

15. The method of claim 14, further comprising:
identifying a classification associated with the obstruction from the at least one signal; and
integrating the classification to the alarm notification.

16. The method of claim 15, wherein the classification includes one or more of a shape, a predicted weight, or a predicted size of the obstruction.

17. The method of claim 15, wherein the classification includes a type of the obstruction.

* * * * *